United States Patent
Raschilla et al.

(10) Patent No.: US 9,634,435 B1
(45) Date of Patent: Apr. 25, 2017

(54) ELECTRIC VEHICLE POWER SUPPLY EQUIPMENT WITH INTERCHANGEABLE POWER SUPPLY CORDS CONFORMING TO DIFFERENT TECHNICAL STANDARDS

(71) Applicant: Delphi Technologies, Inc., Troy, MI (US)

(72) Inventors: Anthony Raschilla, Girard, OH (US); Rangarajan Sundarakrishnamachari, Royapettah (IN); Don E. Bizon, Boardman, OH (US); Jeffrey S. Kiko, Kent, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/159,278

(22) Filed: May 19, 2016

(51) Int. Cl.
| | | |
|---|---|---|
| *H01R 25/00* | (2006.01) | |
| *H01R 13/652* | (2006.01) | |
| *H01R 13/66* | (2006.01) | |
| *H01R 24/00* | (2011.01) | |
| *H01R 103/00* | (2006.01) | |

(52) U.S. Cl.
CPC ....... *H01R 13/652* (2013.01); *H01R 13/6616* (2013.01); *H01R 13/6683* (2013.01); *H01R 24/00* (2013.01); *H01R 25/00* (2013.01); *H01R 2103/00* (2013.01); *H01R 2201/26* (2013.01)

(58) Field of Classification Search
CPC  H01R 13/645; H01R 13/652; H01R 13/6616; H01R 13/6683; H01R 25/00; H01R 27/00; H01R 31/00; H01R 33/00; H01R 31/06; H01R 33/90; H01R 2103/00; H01R 2201/26

USPC ................. 439/639, 640, 300, 108
See application file for complete search history.

(56) References Cited

U.S. PATENT DOCUMENTS

| | | | | |
|---|---|---|---|---|
| 5,125,854 | A * | 6/1992 | Bassler | H01R 13/514 439/536 |
| 6,368,155 | B1 * | 4/2002 | Bassler | H01R 13/6616 340/650 |
| 8,123,535 | B1 * | 2/2012 | Yeon | H01R 13/502 439/101 |
| 8,202,124 | B1 * | 6/2012 | Natter | H01R 13/111 439/225 |
| 8,668,506 | B2 * | 3/2014 | Stack | B60L 11/1818 439/136 |
| 8,740,632 | B2 * | 6/2014 | Osawa | H01R 13/50 439/76.2 |
| 9,065,260 | B2 * | 6/2015 | Billman | H02G 5/02 |
| 9,463,702 | B2 * | 10/2016 | Fukushima | H01R 13/506 |

(Continued)

*Primary Examiner* — Chandrika Prasad
(74) *Attorney, Agent, or Firm* — Robert J. Myers (57) ABSTRACT

An electric vehicle supply equipment (EVSE) assembly for an electric vehicle (EV) or plug-in hybrid electric vehicle (PHEV), often referred to as, optionally having one of at least two interchangeable power supply cords with plugs that conform to different technical standards, such as National Electrical Manufacturers Association (NEMA) 5-15P or 6-20P. The interchangeable power supply cord plugs each include a thermistor adapted to monitor plug temperatures. The electronic module is configured to disable charging until a proper resistance of the thermistor in the plug is detected. The electronic module is also configured to automatically switch between 120 volt and 240 volt operation based on which of the interchangeable power supply cords is connected to the electronic module.

14 Claims, 6 Drawing Sheets

(56) References Cited

U.S. PATENT DOCUMENTS

| | | | |
|---|---|---|---|
| 2013/0052874 A1* | 2/2013 | Fleischmann | F04D 25/08 439/625 |
| 2013/0115821 A1* | 5/2013 | Golko | H01R 13/516 439/638 |
| 2014/0242818 A1* | 8/2014 | Ohmura | B60L 11/1818 439/155 |
| 2015/0222049 A1* | 8/2015 | Armacost | B60D 1/64 439/312 |
| 2016/0006156 A1* | 1/2016 | Shimizu | H01R 4/72 439/310 |

* cited by examiner

ELECTRIC VEHICLE POWER SUPPLY EQUIPMENT WITH INTERCHANGEABLE POWER SUPPLY CORDS CONFORMING TO DIFFERENT TECHNICAL STANDARDS

TECHNICAL FIELD OF THE INVENTION

The invention relates to electric vehicle supply equipment, in particular to electric vehicle supply equipment having multiple interchangeable power supply cords that conform to different technical standards.

BACKGROUND OF THE INVENTION

Electric vehicle supply equipment (EVSE) is a portable charging cord set that supplies alternating current (AC) electrical power to on-board battery chargers present in electric vehicles (EVs) or plug-in hybrid electric vehicles (PHEVs). There are many portable charging cord sets available for consumers to purchase and use with their EVs or PHEVs. A typical original equipment manufacturer (OEM) charging cord set used in North America provides a line operating voltage of 120 Volts AC (VAC) to the vehicle and has a grid cord conforming to the National Electrical Manufacturers Association (NEMA) 5-15 standard which is hard-wired to the EVSE. With a line voltage of 120 VAC, it typicality takes 8-10 hours to completely charge the vehicle's battery pack. As newer charging technologies are developed for EVs and PHEVs, some OEMs are requesting a provision for interchangeable grid cords on the EVSE. This approach enables the consumer to either use the 120 VAC grid cord, or remove that cord and replace it with an interchangeable 240 VAC grid cord conforming to the NEMA 6-20 standard that can be used with a 240 VAC input. The 240 VAC option reduces the overall battery charging time by up to 50%.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, an electric vehicle battery charging assembly is provided. The electric vehicle supply equipment includes an electronic module having a six-way module connector housing in which six module terminals are disposed. A first and second module terminals of the six module terminals are connected power supply circuitry within the electronic module. A third module terminal of the six module terminals is connected to a power supply ground circuit. A fourth and fifth module terminals of the six module terminals are connected to a resistance detection circuit within the electronic module. A sixth module terminal of the six module terminals is connected to a voltage detection circuit within the electronic module. The electric vehicle supply equipment further includes a first power supply cord configured to supply electrical power at about 120 VAC from a socket conforming to the National Electrical Manufacturers Association (NEMA) 5-15S technical standard. The first power supply cord has five wire conductors, a first plug connector conforming to the NEMA 5-15P technical standard, and a first cord connector housing that is configured to mate with the six-way module connector housing in which five first cord terminals are disposed. The first cord connector housing may be a five-way or six-way connector housing.

A first and second power pin and a ground pin of the first plug connector are interconnected by a first, second and third wire conductor of the five wire conductors to a first, second, and third first cord terminals respectively of the five first cord terminals that are configured to interconnect with the first, second, and third module terminals respectively of the six module terminals. A first thermistor is disposed within the first plug connector and is interconnected by a fourth and fifth wire connector to a fourth and fifth first cord terminal of the five first cord terminals that are configured to interconnect with the fourth and fifth module terminals of the six module terminals.

The electric vehicle supply equipment may further include a second power supply cord that is configured to supply electrical power at about 240 VAC from a socket conforming to the National Electrical Manufacturers Association (NEMA) 6-20S technical standard having five wire conductors, a second plug connector conforming to the NEMA 6-20P technical standard, and a six-way second cord connector housing configured to mate with the six-way module connector housing in which six second cord terminals are disposed. A first and second power pin and a ground pin of the second plug connector are interconnected by a first, second and third wire conductor of the five wire conductors to a first, second, and third second cord terminal respectively of the six second cord terminals that are configured to interconnect with the first, second, and third module terminals respectively of the six module terminals. A second thermistor is disposed within the second plug connector and is interconnected by a fourth and fifth wire connector of the five wire conductors to a fourth and fifth second cord terminal of the six second cord terminals that are configured to interconnect with the fourth and fifth module terminals of the six module terminals. A sixth second cord terminal of the six second cord terminals is interconnected to the third second cord terminal of the six second cord terminals and is configured to interconnect with the sixth module terminal of the six module terminals.

The electronic module may further include a controller connected to the voltage detection circuit and the controller may be configured to operate the electronic module with an input voltage of about 240 VAC when the voltage detection circuit detects a ground voltage at the sixth module terminal.

The fourth and fifth module terminals may be shorter than the first, second, third, and sixth module terminals. The fourth and fifth second cord terminals may be shorter than the first, second, third, and sixth second cord terminals.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

An electric vehicle supply equipment (EVSE) assembly for an electric vehicle (EV) or plug-in hybrid electric vehicle (PHEV), is presented herein. The electric vehicle supply equipment assembly optionally has one of at least two interchangeable power supply cords with plugs that conform to different technical standards, such as National Electrical Manufacturers Association (NEMA) 5-15P or 6-20P. The interchangeable power supply cord plugs each include a thermistor adapted to monitor plug temperatures. The EVSE assembly is configured to disable charging until a proper resistance of the thermistor in the plug is detected, thereby indicating the plug is within an acceptable temperature range. The EVSE assembly is also configured to detect ground circuit faults and current overvoltage conditions, providing additional circuit protection to that provided by the grid supply circuit. The EVSE assembly is further configured to automatically switch between 120 volt and 240 volt operation based on which of the interchangeable power supply cords is connected to the EVSE.

Although the disclosure hereof is detailed and exact to enable those skilled in the art to practice the invention, the physical embodiments herein disclosed merely exemplify the invention which may be embodied in other specific structures. While a preferred embodiment has been described, the details may be changed without departing from the invention. A description of example embodiments of the invention follows.

Figure 1:
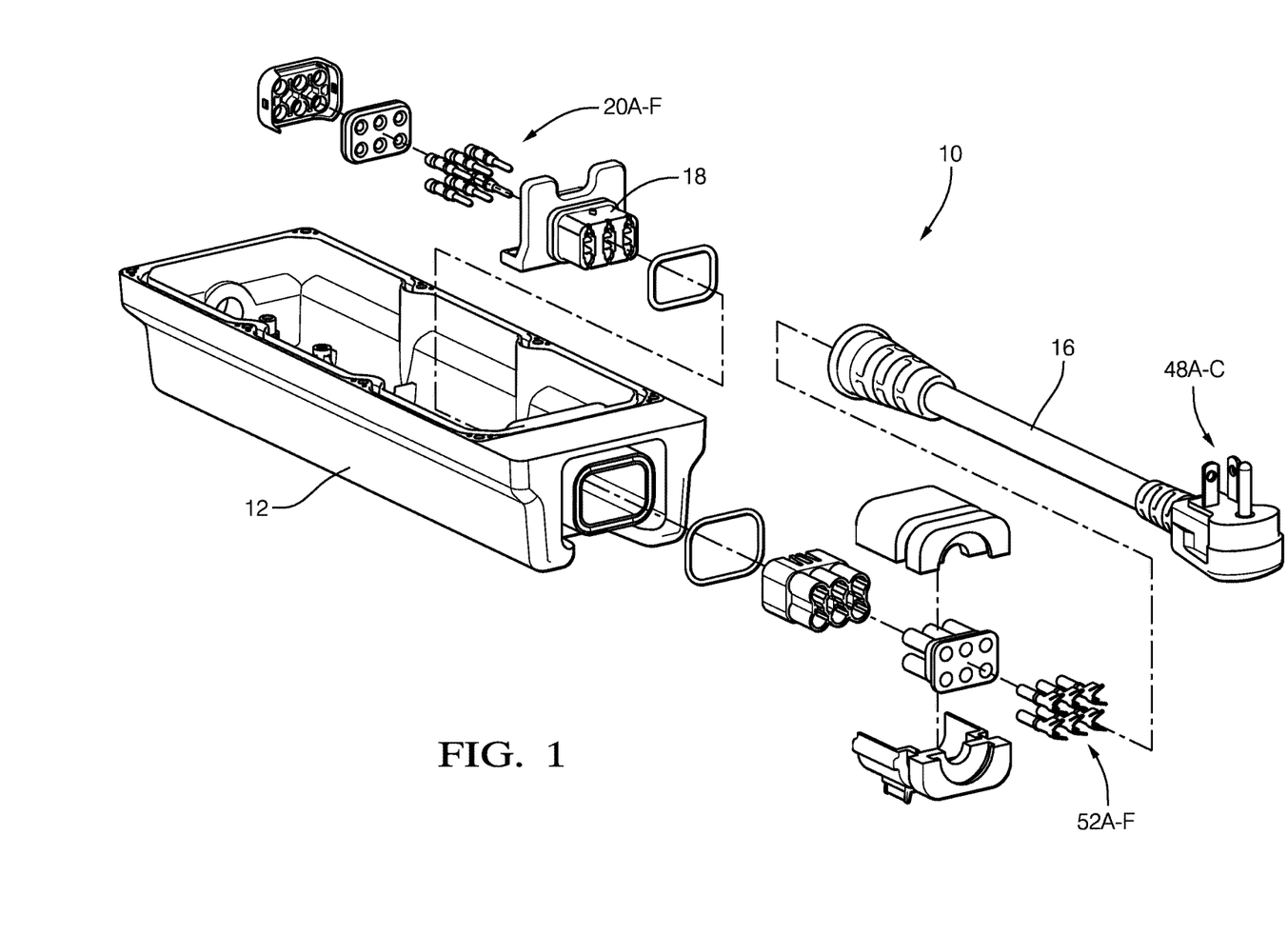
FIG. 1 is an exploded perspective view of an electric vehicle supply equipment according to one embodiment.

FIGS. 1-7B illustrate a non-limiting example of an electric vehicle supply equipment assembly 10. As shown in FIG. 1, the electric vehicle supply equipment assembly 10, hereinafter referred to as the assembly 10, includes an electronic module 12, hereinafter referred to as the module 12, that contains the electronic circuitry of the EVSE assembly, a first detachable power supply cord 14 that is configured to supply electrical power at about 120 VAC from a socket (not shown) conforming to the National Electrical Manufacturers Association (NEMA) 5-15S technical standard, and a second detachable power supply cord 16 that is configured to supply electrical power at about 240 VAC from a socket (not shown) conforming to the NEMA 6-20S technical standard. As used herein, about 120 VAC is a voltage in the range of 114 VAC to 126 VAC and is hereinafter referred to as 120 VAC and about 240 VAC is a voltage in the range of 228 VAC to 252 VAC and is hereafter referred to as 240 VAC.

Figure 2:
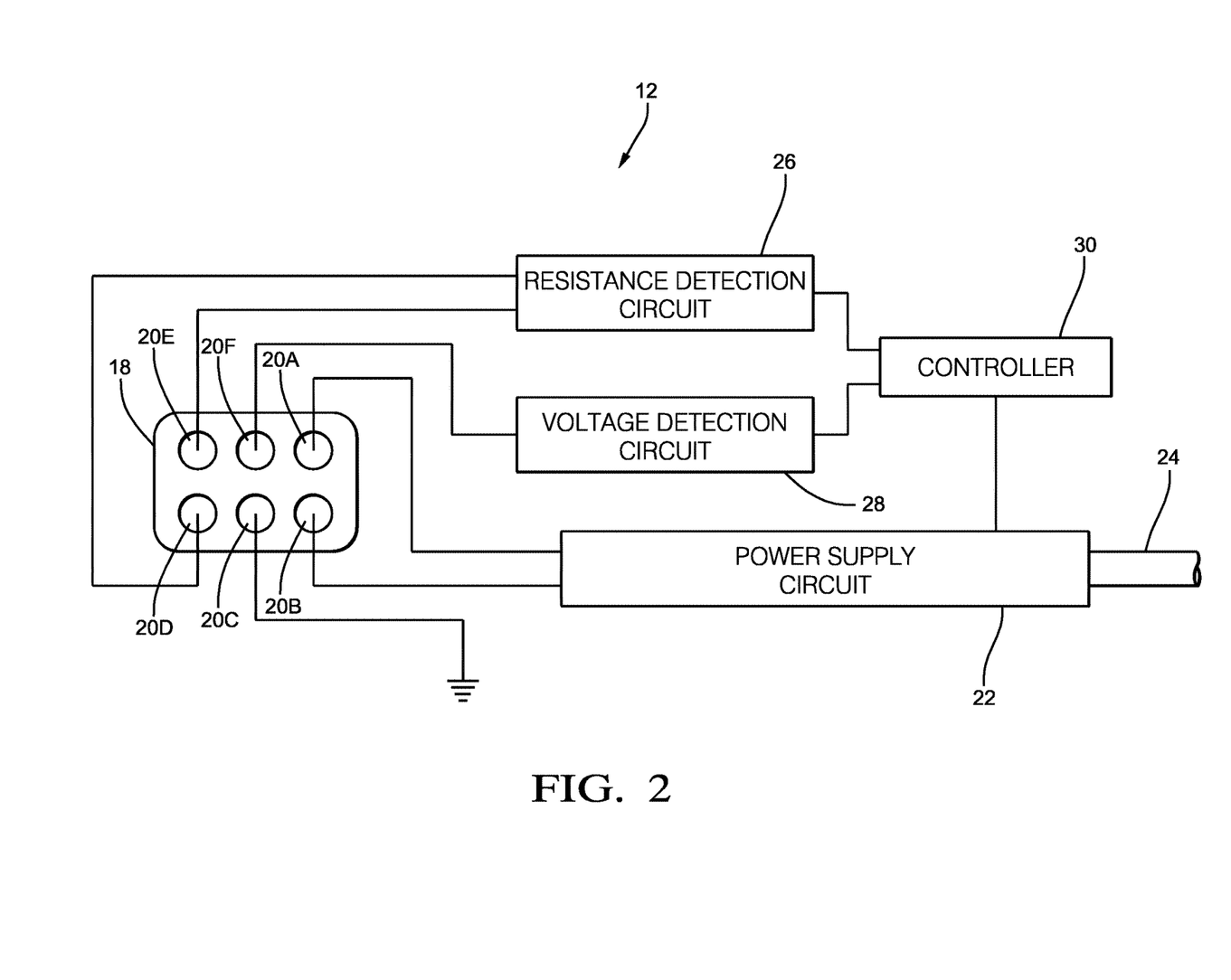
FIG. 2 is a schematic diagram view of a the electric vehicle supply equipment of FIG. 1 according to one embodiment.
Figure 3:
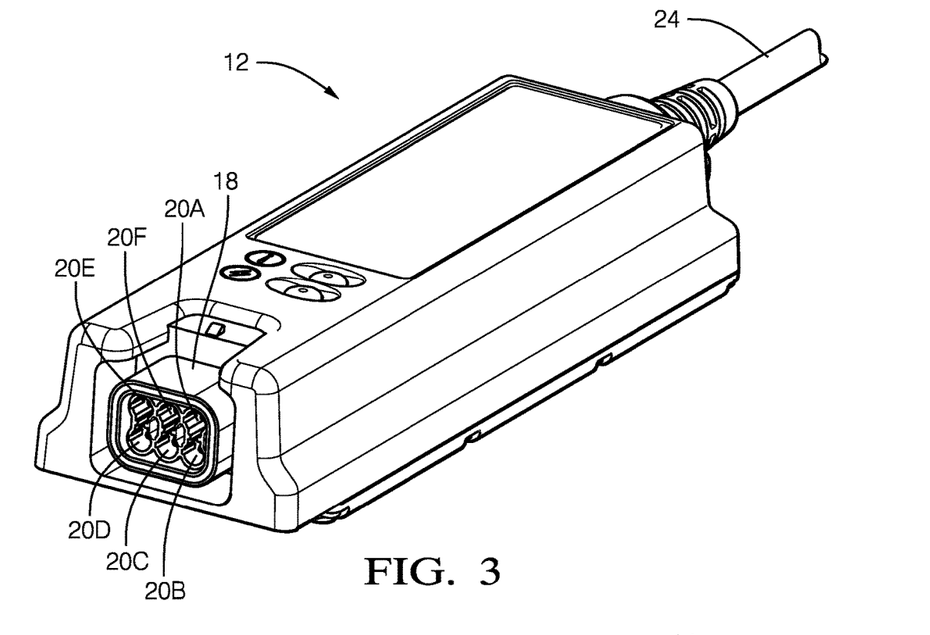
FIG. 3 is a perspective view of the electric vehicle supply equipment of FIG. 1 according to one embodiment.

As shown in FIGS. 2 and 3, the module 12 includes a six-way module connector housing 18 in which six round male pin module terminals 20A-20F are disposed. The first and second module terminals 20A, 20B are connected to a power supply circuit 22 within the module 12 that converts the 120 VAC or 240 VAC electrical power delivered to the module 12 by the first or second power supply cords 14, 16 to a direct current voltage that is output to the electric vehicle via a power output cord 24 to a coupler (not shown) that is configured to interconnect to the vehicle's charging port (not shown). The third module terminal 20C is connected to a power supply ground circuit. The fourth and fifth module terminals 20D, 20E are connected to a resistance detection circuit 26 within the module 12 and the sixth module terminal 20F is connected to a voltage detection circuit 28 within the module 12. The resistance detection circuit 26 and the voltage detection circuit 28 are both connected to a controller 30 that is configured to control the power supply circuit 22 as will be explained below.

Figure 4:
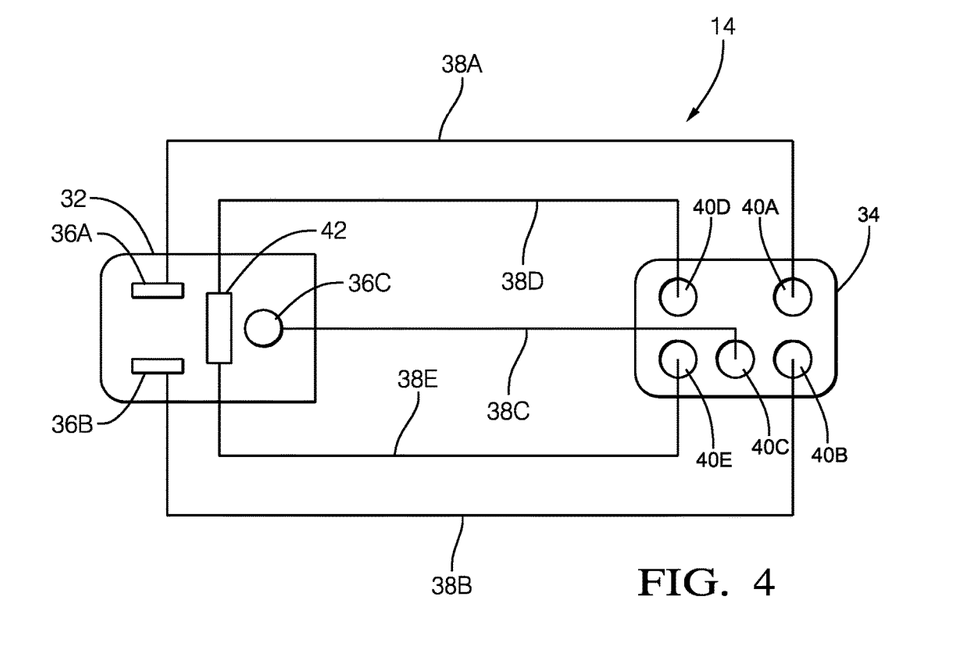
FIG. 4 is a schematic diagram view of a first power supply cord of the electric vehicle supply equipment of FIG. 1 according to one embodiment.
Figure 5A:
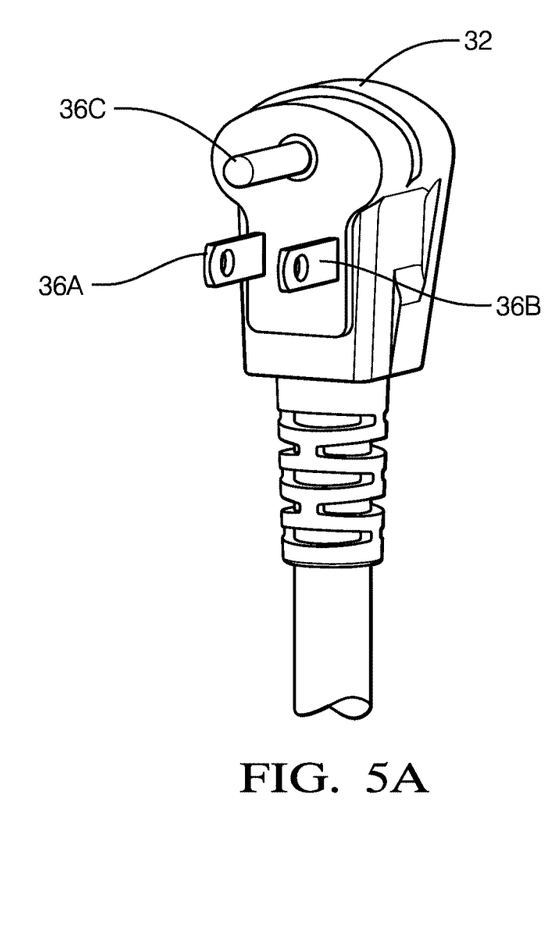
FIG. 5A is a close up view of a plug connector of the first power supply cord of the electric vehicle supply equipment of FIG. 1 according to one embodiment.
Figure 5B:
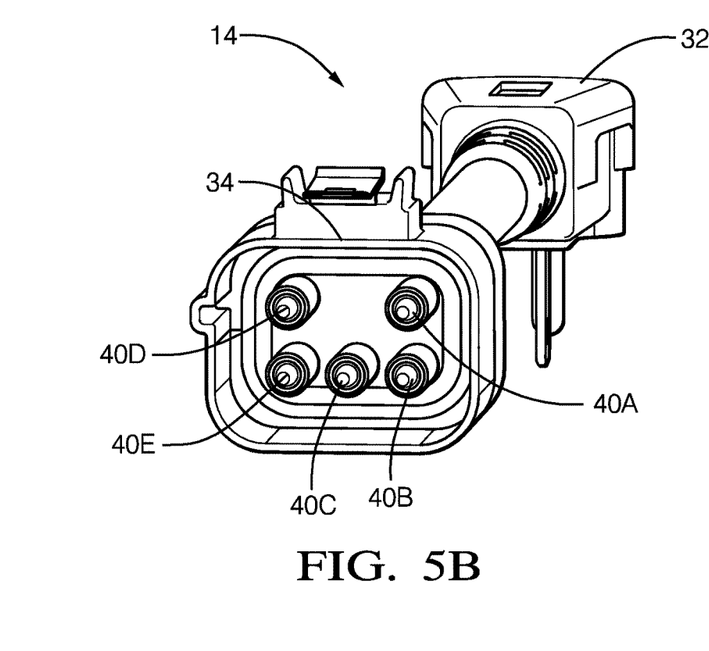
FIG. 5B is a close up view of a cord connector of the first power supply cord of the electric vehicle supply equipment of FIG. 1 according to one embodiment.

As shown in FIGS. 4, 5A, and 5B, the first power supply cord 14 has five wire conductors 38A-38E contained within an insulative jacket (not shown), a first plug connector 32 conforming to the NEMA 5-15P technical standard, and a first cord connector housing 34 configured to mate with the six-way module connector housing 18 in which five female socket first cord terminals 40A-40E are disposed. The first and second power pin 36A, 36B and a ground pin 36C of the first plug connector 32 conform to the NEMA 5-15P standard and are made of a conductive material, such as a copper alloy. The first and second power pin 36A, 36B and the ground pin 36C are interconnected by the first, second and third wire conductors 38A, 38B, 38C of the five wire conductors to the first, second, and third first cord terminals 40A, 40B, 40C respectively. These first cord terminals 40A, 40B, 40C are configured to interconnect with the first, second, and third module terminals 20A, 20B, 20C respectively. A first thermistor 42 is disposed within the first plug connector 32 and is interconnected by a fourth and fifth wire connector 38D, 38E to the fourth and fifth first cord terminals 40D, 40E. These terminals are configured to interconnect with the fourth and fifth module terminals 20D, 20E. The first thermistor 42 is interconnected to the resistance detection circuit 26 in the module 12. A change in the resistance of the first thermistor 42 indicates a change in the temperature of the first plug connector 32.

Figure 6:
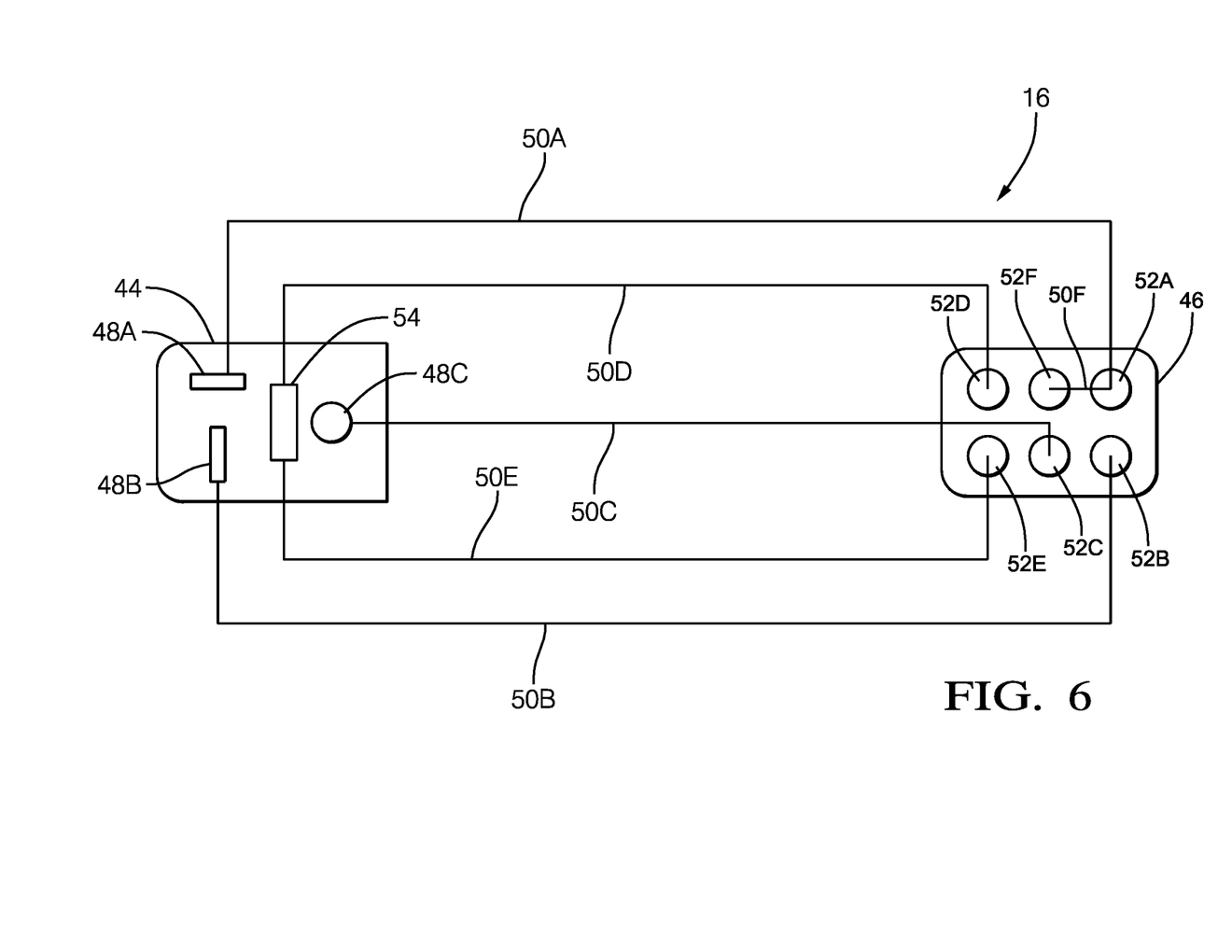
FIG. 6 is a schematic diagram view of a second power supply cord of the electric vehicle supply equipment of FIG. 1 according to one embodiment.
Figure 7A:
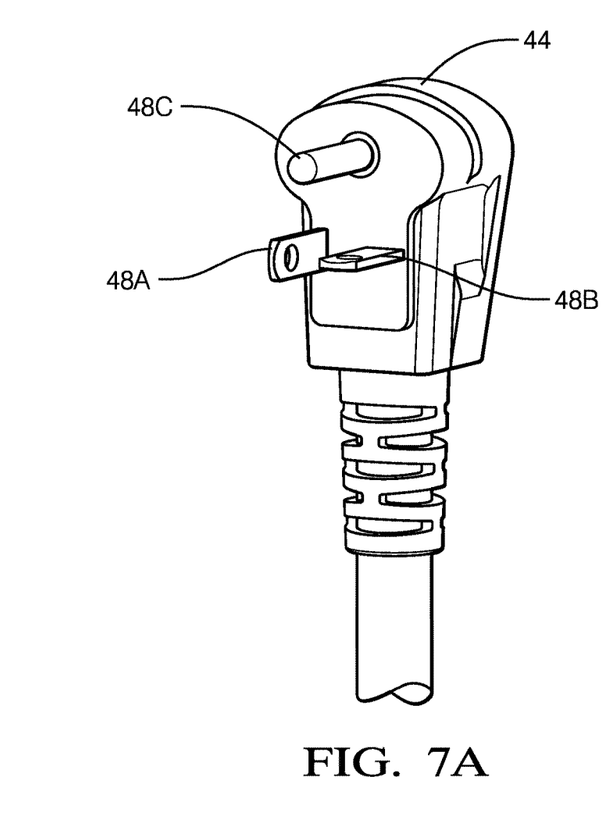
FIG. 7A is a close up view of a plug connector of the second power supply cord of the electric vehicle supply equipment of FIG. 1 according to one embodiment.
Figure 7B:
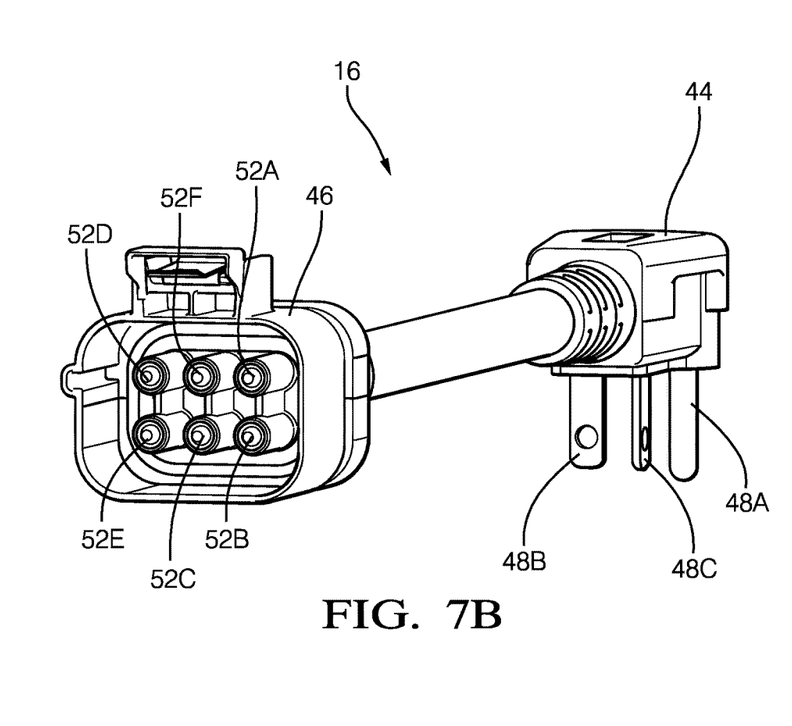
FIG. 7B is a close up view of a cord connector of the second power supply cord of the electric vehicle supply equipment of FIG. 1 according to one embodiment.

As shown in FIGS. 6, 7A, and 7B, the second power supply cord 16 has five wire conductors 50A-50E contained within an insulative jacket (not shown), a second plug connector 44 conforming to the NEMA 6-20P technical standard, and a six way second cord connector housing 46 configured to mate with the six-way module connector housing 18 in which six female socket second cord terminals 52A-52F are disposed. The first and second power pin 48A, 48B and a ground pin 48C of the second plug connector 44 conform to the NEMA 6-20P standard and are made of a conductive material, such as a copper alloy. The first and second power pin 48A, 48B and the ground pin 48C of the second plug connector 44 are interconnected by a first, second and third wire conductor 50A, 50B, 50C to a first, second, and third second cord terminal 52A, 52B, 52C respectively. These terminals 52A, 52B, 52C are configured to interconnect with the first, second, and third module terminals 20A, 20B, 20C respectively. A second thermistor 54 having the same characteristics and the first thermistor 42 is disposed within the second plug connector 44 and is interconnected by a fourth and fifth wire conductor 50D, 50E to the fourth and fifth second cord terminals 52D, 52E that are configured to interconnect with the fourth and fifth module terminals 20D, 20E. A sixth second cord terminal 52F is interconnected to the third second cord terminal 52C by a jumper 50F and is configured to interconnect with the sixth module terminal 20F.

The controller 30 may include a processor (not shown) such as a microprocessor or other control circuitry as should be evident to those in the art. The controller 30 may also include analog to digital convertor circuitry (not shown) and digital to analog convertor circuitry (not shown) to be able to communicate with the resistance detection circuit 26, the voltage detection circuit 28, the power supply circuit 22 and other circuitry (not shown) that may be included in the module 12. The controller 30 may also include memory (not shown), including non-volatile memory, such as electrically erasable programmable read-only memory (EEPROM) for storing one or more routines, thresholds and captured data. The one or more routines may be executed by the processor to perform steps for determining the value of the output of the resistance detection circuit 26, the value of the output of the voltage detection circuit 28, and operation of the power supply circuit 22 based on these output values.

The resistance detection circuit 26 may be a simple voltage divider network and an analog to digital convertor circuit of the controller 30 that is connected to the resistance detection circuit 26 can determine the voltage and provide a digital datum to the controller 30 indicating the value of the voltage and therefore the temperature of the first plug connector 32. The controller 30 may be programmed to inhibit operation of the power supply circuit 22 when the temperature of the first plug connector 32 exceeds a threshold temperature.

The fourth and fifth module terminals 20D, 20E and/or the fourth and fifth cord terminals 40D, 40E, 52D, 52E of the first and second power supply cord 14, 16 may be shorter than the other terminals 20A-C, 20F, 40A-C, 52A-C, 52F and are configured to connect only after the other terminals 20A-C, 20F, 40A-C, 52A-C, 52F have been connected. The controller 30 may also be programmed to inhibit operation until a resistance value within an expected range is detected by the resistance detection circuit 26. In addition, the third module terminal 20C and/or the third cord terminals 40C, 52C may be longer than the other terminals in order to complete a ground circuit prior to the connection of the other circuits.

The voltage detection circuit 28 may be a simple pull up circuit that is connected to an input of the controller 30. When the first power supply cord 14 is connected to the module 12, the voltage on the sixth module terminal 20F is at the pull up voltage and the controller 30 configures the power supply circuit 22 to accept 120 VAC electrical power. However, when the second power supply cord 16 is attached the sixth module terminal 20F is at ground voltage due to the interconnection of the third and sixth second cord terminals 52C, 52F. When the controller 30 detects ground voltage via the input attached to the voltage, the controller 30 configures the power supply circuit 22 to accept 240 VAC electrical power.

The first cord connector housing 34 may be a five-way connector housing 34 was shown in FIGS. 4 and 5B or it may be a six-way connector housing 46 as shown in FIG. 7B with an empty sixth terminal cavity. While the illustrated examples of the connector housings have connector cavities configured to receive the terminals in a 2 by 3 array, other embodiments may be arranged according to a different configuration, e.g. a 3 by 2 array, a 1 by 6 array or a circular arrangement with terminal cavities spaced at 60 degree intervals. The arrangement and order of the terminals may also be changed in other embodiments.

As shown in FIGS. 3, 5B and 7B, the six-way module connector housing 18 and the first and second cord connector housings 34, 46 have corresponding locking features configured to inhibit inadvertent disconnection of the power supply cords from the module 12.

While the illustrated example shows power supply cords having first and second plug connectors 32, 44 conforming to NEMA 5-15 and 6-20 standards, other embodiments may be envisioned wherein the plug connectors conform to other technical standards, such as Europlug CCE 7/16, British Standard (BS) 1363, Australian/New Zealand Standard AS/NZS 3112, or Chinese PPCS-CCC technical standards.

In an alternative embodiment, the first and second thermistors 42, 54 are chosen so that they have different initial resistance values. For example, the first thermistor 42 may be a negative temperature coefficient (NTC) type thermistor while the second thermistor 54 may be a positive temperature coefficient (PTC) type thermistor. The first thermistor 42 may be selected so that its resistance at normal ambient temperatures is near the highest value in the allowable resistance range and the second thermistor 54 may be selected so that its resistance at normal ambient temperatures is near the lowest value in the allowable resistance range. The controller 30 may be configured to determine whether the first or second power supply cord 16 is attached based on the initial thermistor resistance value output by the resistance detection circuit 26. This could be used in place of the voltage detection circuit 28 input or in conjunction with it to improve determination of the power supply circuit's 22 operation.

Therefore an electric vehicle supply equipment assembly 10 having two interchangeable power supply cords 14, 16 is provided. The assembly 10 provides the benefit of detecting whether a power supply cord configured to connect with a 120 VAC socket or a 240 VAC socket is connected and automatically configure the module 12 for 120 VAC or 240 VAC operation without any further operator action. This automatic detection prevents damage that may occur to a similar EVSE if an operator changes the power supply cord but does not set the EVSE to the proper operating voltage configuration.

While the illustrated embodiment is an electrical vehicle supply equipment assembly, other embodiments of this invention may be used for other electrical devices that are configured to be powered by two different voltages supplied by power cords conforming to different technical standards. Still other embodiments of the invention may be envisioned in which the thermistor is not installed within the plug. In these embodiments the associated wire conductors, cord terminals, and module terminals may be deleted.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electric vehicle power supply equipment, comprising:
an electronic module having a six-way module connector housing in which six module terminals are disposed, wherein a first and second module terminal of said six module terminals are connected to power supply circuitry within the electronic module, wherein a third module terminal of said six module terminals is connected to a power supply ground circuit, wherein a fourth and fifth module terminal of said six module terminals are connected to a resistance detection circuit within the electronic module, and wherein a sixth module terminal of said six module terminal is connected to a voltage detection circuit within the electronic module;

a first power supply cord configured to supply electrical power at about 120 VAC from a socket conforming to the National Electrical Manufacturers Association (NEMA) 5-15S technical standard having five wire conductors, a first plug connector conforming to the NEMA 5-15P technical standard, and a first cord connector housing configured to mate with the six-way module connector housing in which five first cord terminals are disposed, wherein a first and second power pin and a ground pin of the first plug connector are interconnected by a first, second and third wire conductor of said five wire conductors to a first, second, and third first cord terminal respectively of said five first cord terminals that are configured to interconnect with the first, second, and third module terminals respectively of said six module terminals, and wherein a first thermistor is disposed within the first plug connector and is interconnected by a fourth and fifth wire connector to a fourth and fifth first cord terminal of said five first cord terminals that are configured to interconnect with the fourth and fifth module terminals of said six module terminals.

2. The electric vehicle power supply equipment according to claim 1, further comprising a second power supply cord configured to supply electrical power at about 240 VAC from a socket conforming to the NEMA 6-20S technical standard having five wire conductors, a second plug connector conforming to the NEMA 6-20P technical standard, and six-way second cord connector housing configured to mate with the six-way module connector housing in which six second cord terminals are disposed, wherein a first and second power pin and a ground pin of the second plug connector are interconnected by a first, second and third wire conductor of said five wire conductors to a first, second, and third second cord terminal respectively of said six second cord terminals that are configured to interconnect with the first, second, and third module terminals respectively of said six module terminals, wherein a second thermistor is disposed within the second plug connector and is interconnected by a fourth and fifth wire connector of said five wire conductors to a fourth and fifth second cord terminal of said six second cord terminals that are configured to interconnect with the fourth and fifth module terminals of said six module terminals, wherein a sixth second cord terminal of said six second cord terminals is interconnected to the third second cord terminal of said six second cord terminals and is configured to interconnect with the sixth module terminal of said six module terminals.

3. The electric vehicle power supply equipment according to claim 2, wherein the fourth and fifth second cord terminals are shorter than the first, second, third, and sixth second cord terminals.

4. The electric vehicle power supply equipment according to claim 1, wherein the electronic module further includes a controller connected to the voltage detection circuit and wherein the controller is configured to operate the electronic module with an input voltage of about 240 VAC when the voltage detection circuit detects a ground voltage at the sixth module terminal.

5. The electric vehicle power supply equipment according to claim 1, wherein the fourth and fifth module terminals are shorter than the first, second, third, and sixth module terminals.

6. The electric vehicle power supply equipment according to claim 1, wherein the fourth and fifth first cord terminals are shorter than the first, second, and third first cord terminals.

7. The electric vehicle power supply equipment according to claim 1, wherein the first cord connector housing is a five-way connector housing.

8. The electric vehicle power supply equipment according to claim 1, wherein the first cord connector housing is a six-way connector housing.

9. A power supply cord configured to supply electrical power at about 120 VAC from a socket conforming to the 5-15S technical standard to an electronic module having a six-way module connector housing in which six module terminals are disposed, wherein a first and second module terminals of said six module terminals are connected power supply circuitry within the electronic module, wherein a third module terminal of said six module terminals is connected to a power supply ground circuit, wherein a fourth and fifth module terminals of said six module terminals are connected to a resistance detection circuit within the electronic module, and wherein a wherein a sixth module terminal of said six module terminals is connected to a voltage detection circuit within the electronic module, said power supply cord comprising:

five wire conductors;

a plug connector conforming to the NEMA 5-15P technical standard;

a cord connector housing configured to mate with the six-way module connector housing; and five cord terminals disposed within the cord connector housing, wherein a first and second power pin and a ground pin of the plug connector are interconnected by a first, second and third wire conductor of said five wire conductors to a first, second, and third cord terminal respectively of said five cord terminals that are configured to interconnect with the first, second, and third module terminals respectively of said six module terminals, and wherein a thermistor is disposed within the plug connector and is interconnected by a fourth and fifth wire connector to a fourth and fifth cord terminals of said five cord terminals that are configured to interconnect with the fourth and fifth module terminals of said six module terminals.

10. The power supply cord according to claim 9, wherein the fourth and fifth cord terminals are shorter than the first, second, and third first cord terminals.

11. The power supply cord according to claim 9, wherein the first cord connector housing is a five-way connector housing.

12. The power supply cord according to claim 9, wherein the first cord connector housing is a six-way connector housing.

13. A power supply cord configured to supply electrical power at about 240 VAC from a socket conforming to the 6-20S technical standard to an electronic module having a six-way module connector housing in which six module terminals are disposed, wherein a first and second module terminals of said six module terminals are connected power supply circuitry within the electronic module, wherein a third module terminal of said six module terminals is connected to a power supply ground circuit, wherein a fourth and fifth module terminals of said six module terminals are connected to a resistance detection circuit within the electronic module, and wherein a wherein a sixth module terminal of said six module terminals is connected to a voltage detection circuit within the electronic module, said power supply cord comprising:

five wire conductors;

a plug connector conforming to the NEMA 6-20P technical standard;

a six way cord connector housing configured to mate with the six-way module connector housing; and     six cord terminals within the cord connector housing, wherein a first and second power pin and a ground pin of the plug connector are interconnected by a first, second and third wire conductor of said five wire conductors to a first, second, and third cord terminals respectively of said six cord terminals that are configured to interconnect with the first, second, and third module terminals respectively of said six module terminals, wherein a thermistor is disposed within the plug connector and is interconnected by a fourth and fifth wire connector of said five wire conductors to a fourth and fifth cord terminals of said six cord terminals that are configured to interconnect with the fourth and fifth module terminals of said six module terminals, wherein a sixth cord terminal of said six cord terminals is interconnected to the third cord terminal of said six second cord terminals and is configured to interconnect with the sixth module terminal of said six module terminals.

14. The power supply cord according to claim 13, wherein the fourth and fifth cord terminals are shorter than the first, second, and third cord terminals.

* * * * *